US008874729B2

(12) United States Patent
Hu et al.

(10) Patent No.: US 8,874,729 B2
(45) Date of Patent: Oct. 28, 2014

(54) POLICY AS A NETWORK SERVICE IN A MOBILE CORE NETWORK

(75) Inventors: Qingmin Hu, Sammamish, WA (US); Douglas Eng, Sammamish, WA (US); Jie McKnight, Bellevue, WA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 358 days.

(21) Appl. No.: 13/081,273

(22) Filed: Apr. 6, 2011

(65) Prior Publication Data

US 2012/0259970 A1    Oct. 11, 2012

(51) Int. Cl.
G06F 15/173 (2006.01)
H04W 4/20 (2009.01)
H04W 28/16 (2009.01)

(52) U.S. Cl.
CPC .............. *H04W 4/20* (2013.01); *H04W 28/16* (2013.01)
USPC ........... 709/224; 709/231; 709/232; 709/220; 709/218; 709/203; 370/310; 370/331; 370/230; 455/434

(58) Field of Classification Search
USPC .......... 709/224, 220, 218, 232; 370/310, 331, 370/230
See application file for complete search history.

(56) References Cited

U.S. PATENT DOCUMENTS

| 2008/0019335 | A1* | 1/2008 | Wallace et al. | 370/338 |
|---|---|---|---|---|
| 2010/0093380 | A1 | 4/2010 | Gustaffson | |
| 2011/0039518 | A1* | 2/2011 | Maria | 455/406 |
| 2011/0158090 | A1* | 6/2011 | Riley et al. | 370/230 |
| 2012/0155282 | A1* | 6/2012 | Dorenbosch | 370/241.1 |
| 2012/0224563 | A1* | 9/2012 | Zisimopoulos et al. | 370/331 |

OTHER PUBLICATIONS

"3rd Generation Partnership Project; Technical Specification Group Services and System Aspects; Policy and charging control architecture (Release 11)". 3GPP Standard; 3GPP TS 23.203, 3rd Generation Partnership Project (3GPP), Mobile Competence Centre; 650, Route Des Lucioles; F-06921 Sophia-Antipolic Cedex; France, No. V11.1. 0, Mar. 17, 2011, pp. 1-136, XP050476336. Last accessed Mar. 17, 2011, 136 pages.

International Search Report, mailed Jul. 27, 2012, for International Application No. PCT/US2012/029947, 8 pages.

* cited by examiner

*Primary Examiner* — Faruk Hamza
*Assistant Examiner* — Shah R Zaman
(74) *Attorney, Agent, or Firm* — Amin, Turocy & Watson, LLP

(57) ABSTRACT

Aspects describe using a network element to facilitate scalability within a communication network and to provide policy as a network service in a mobile core network. The network element can be scalable and can be a primary policy access gateway for a first geographic region and can be a secondary policy access gateway for at least a second geographic region. The first geographic region and the second geographic region can have portions that overlap. Further, the network element can hide topology of the home network from roaming partners.

20 Claims, 12 Drawing Sheets

POLICY AS A NETWORK SERVICE IN A MOBILE CORE NETWORK

TECHNICAL FIELD

The subject disclosure relates to wireless communications and, more particularly, to policy servers that operate as a policy service function within a deployable network architecture of a wireless communications network.

BACKGROUND

With the increasingly high demand for mobile broadband services, network operators are rushing to deploy large-scale networks. Such networks include Long Term Evolution (LTE) networks as well as other types of networks. The services that can be supported on the networks include both data (particularly video) and voice. These services need Quality of Services (QoS) and some services (such as voice) will need guaranteed bit rate bearers to deliver a positive customer experience. In addition, operators should be able to differentiate, control, and bill different types of traffic on the network.

Traditionally, policy management for telecommunication networks has focused mainly on network management. In recent years, however, as wireless networks have migrated toward Internet Protocol (IP)-based service environments, policy management has been gaining increasing importance to telecommunication networks that manage and control those services. Thus, policy management becomes an important component in the deployment.

Although policy management has been standardized in some networks, such as LTE networks, the deployment use cases and architecture are not covered in the standard and it is up to each operator to decide how to deploy the network based on its services and use cases. Further, each separate service, or class of services, requests the networks to apply different policy mechanisms, depending on the type of request being handled. Additionally, most of the management functions are scattered across the network and tend to be performed in a localized and static fashion.

For instance, when a user of a networked portable device, such as a cell phone, Personal Digital Assistant (PDA), laptop, or the like, request(s) access to one or more services offered through the one more networks, there is no common manner to track access and user requests based on type of services, such as voice. Further, there is no common means to manage, store, update, and so forth, the in session and/or cross session, dynamic policy related information.

In deploying networks, it is important to provide network resources based on the need of mobile services. Although policy and charging control (PCC) has generally been defined (e.g., for LTE network by 3GPP), it does not cover using the policy itself as a service.

The above-described deficiencies of today's policy deployment architectures are merely intended to provide an overview of some of the problems of conventional systems, and are not intended to be exhaustive. Other problems with conventional systems and corresponding benefits of the various non-limiting embodiments described herein may become further apparent upon review of the following description.

SUMMARY

A simplified summary is provided herein to help enable a basic or general understanding of various aspects of exemplary, non-limiting embodiments that follow in the more detailed description and the accompanying drawings. This summary is not intended, however, as an extensive or exhaustive overview. Instead, the sole purpose of this summary is to present some concepts related to some exemplary non-limiting embodiments in a simplified form as a prelude to the more detailed description of the various embodiments that follow.

Various embodiments provide a deployable network architecture that enable policy servers to operate as a policy service function that can track service information, cache the service information dynamically, and provide network information to dynamically manage mobile services.

Other embodiments relate to a network element that can operate as a primary policy access gateway for a first geographic region and as a secondary policy access gateway for a second (or subsequent) geographic regions. The first geographic region and the second (or subsequent) geographic regions can overlap, at least in part.

Further, the various embodiments are configured to utilize a network element or policy access gateway that communicates with various network entities. Further, the network element can communicate with roaming partners on behalf of the various network entities, thus hiding the home network topology from the visited roaming partners.

These and other embodiments are described in more detail below.

BRIEF DESCRIPTION OF THE DRAWINGS

Various non-limiting embodiments are further described with reference to the accompanying drawings in which.

DETAILED DESCRIPTION

Overview

Figure 1:
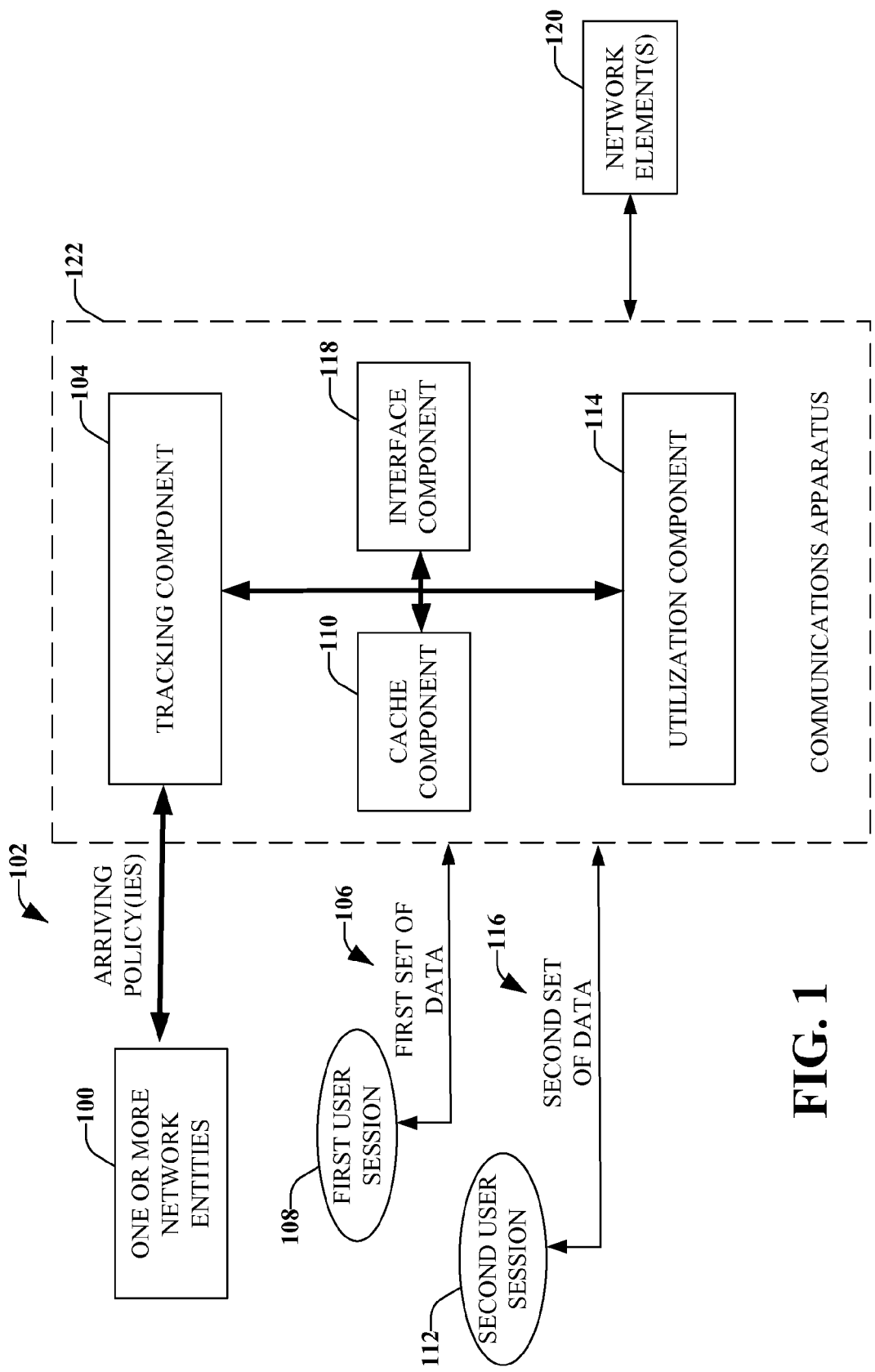
FIG. 1 illustrates a high-level block diagram of an exemplary communication system, according to an aspect.

Mobile services increasingly demand more intelligence in the core network to deal with bandwidth demand, Quality of Service (QoS), differentiated billing, and other traffic treatments that are unique to specific services and applications. As a result of this increasing demand, more and more network elements should be policy enabled in order to be able to treat service traffic differently based on service characteristics. On the other hand, services and applications should have information about the network condition to further customize the application dynamically in order to provide a positive user experience. The network policy information traditionally is not retained in the network, or, even if the network policy information exists, it is often scattered throughout the network. In addition, service layer information is typically dynamic and not available for use within the network.

Network deployment should support Internet Protocol (IP)-based and non-IP based service traffic, including voice services and mobile data services. A challenge with deploying a core network, such as a LTE core network, for example, is to provide network resources based on the need of mobile services. Thus, the core network should retain and manage service information and provide appropriate information based on the services that use the network resources. For example, the services should be network resources aware and the network should be service aware. A link between the two is a policy management framework. The policy information is an enabler for network intelligence. Although policy and charging control (PCC) has been defined for various networks, such policies do not cover using the policy itself as a service.

Thus, it would be beneficial to provide a deployable network architecture that enables policy servers to operate as a policy service function that can track service information, cache the service information dynamically, and provide the network information to dynamically manage mobile services. The various aspects can also provide the ability to manage in session and/or cross session policy related information. Furthermore, the disclosed aspects can enable distribution of policies and/or policy related information, such as policy notification, within the mobile network.

An aspect relates to an apparatus that includes a tracking component configured to monitor a first state of a first user service activity. The apparatus also includes a cache component configured to retain the first state of the first user service activity. Further, the apparatus includes an interface component configured to communicate the first state of the first user service activity to a plurality of managed mobile services.

In some implementations, the interface component is further configured to receive information related to a second state of a second user service activity. The first user service activity and the second user service activity are associated with a user equipment in a first geographic area.

In an implementation, the apparatus further includes a support module configured to provide direct support for the first geographic area and indirect support for a second geographic area. At least a portion of the first geographic area and the second geographic area comprise a common area.

According to some implementations, the apparatus is configured to hide a topology of a home network from a roaming partner. In a further implementation, the first user service activity comprises a first activity and a second activity for a user equipment. In another implementation, the first user service activity comprises a plurality of services provided to one user equipment. In still another implementation, the first user service activity is provided by different network elements.

Another aspect relates to a method performed by a network entity for providing mobile services. The method includes tracking a set of first user session data associated with a first session for a user device. The set of first user session data is temporarily cached. The method also includes sending the set of first user session data to a data store.

In an implementation, the method further includes receiving an indication of a second session for the user device and obtaining the set of first user session data from the data store. Method also includes applying the set of first user session data to the second session for the user device.

In some implementations, the method includes pushing session record information of the set of first user session data to at least one gateway for authorized access. In an aspect, the pushing comprises providing the session record information to at least one of a network element, an application, a resource, or another gateway.

According to some implementations, the method includes associating the set of first user session data with policy record information. In other implementations, the method includes communicating with a roaming network, wherein the communicating hides the home network topology from visited roaming network.

In some aspects, the method includes generating a session record for the set of first user session data. The session record comprises an identification of the user device and associated network elements. In other aspects, the method includes providing routing between network entities and five or more service zones.

According to another aspect is a system that includes a first component configured to monitor a set of first user service activities within a first geographic region. Also included is a second component configured to monitor a set of second user service activities within the first geographic region. The first user service activities and the second user service activities are for a user device.

In an implementation, the system comprises a third component configured to provide backup support for a network entity. The network entity monitors a third set of user service activities associated with a second geographic region. At least a portion of the first geographic region and the second geographic region overlap. The backup support provides redundancy.

In another implementation, the first component is further configured to point to an active policy record information in a network element. In some implementations, the first component interfaces to a plurality of network elements that perform functions related to policies and charging functions.

Herein, an overview of some of the embodiments for a scalable policy deployment architecture has been presented above. As a roadmap for what follows next, various exemplary, non-limiting embodiments and features for policy deployment architectures are described in more detail. Then, some non-limiting implementations and examples are given for additional illustration, followed by representative networks and environments in which such embodiments and/or features can be implemented.

Policy as a Network Service in a Mobile Core Network

By way of further description with respect to one or more non-limiting ways to provide a scalable policy deployment architecture, a high-level block diagram of an exemplary communication system is illustrated generally by FIG. 1. The communication system can be included in an environment, which can be a communications network and/or a set of communication networks. Network types can include Universal Mobile Telecommunications Systems (UMTS), Long Term Evolution (LTE), High Speed Packet Access (HSPA), Code Division Multiple Access (CDMA), Multi-Carrier Code Division Multiple Access (MC-CDMA), Single-Carrier Code Division Multiple Access (SC-CDMA), Time Division Multiple Access (TDMA), Frequency Division Multiple Access (FDMA), Single-Carrier FDMA (SC-FDMA), Orthogonal Frequency Division Multiple Access (OFDMA), and so on. Although the various aspects and examples are discussed herein with respect to a LTE network, it should be appreciated that the disclosed aspects can be utilized with other networks and any references to LTE networks are for purposes of simplicity of describing the various aspects.

The environment can include a multitude of network entities 100. Network entities, can include, but are not limited to, Policy Controlling and Rules Functions (PCRFs), Policy and Charging Enforcement Functions (PCEFs), Diameter Routing Agents (DRAs), Balance Managers (BMs), Session Border Controllers (SBCs), gateways (e.g., messaging gateway), application and content providers, and so forth. A BM can manage, for example, quota gigabytes per month, which can track the amount of usage for each user equipment. Such usage can be tracked for billing purposes (e.g., pay per view) or for other purposes (e.g., statistical information, usage information, and so forth). SBCs can control the signaling and the media streams involved in setting up, conducting, and tearing down voice calls or other interactive media and can comprise an Application Function (AP).

The network entities 100 can deploy one or more policies. As used herein, "policies" refers to a set of one or more rules that a network operator can define and enforce in a telecommunications network (e.g., environment). The policies can be exchanged and can be applied both within an operator domain and across different operator domains.

The policies are input in the form of one or more arriving policies 102 to a tracking component 104. In accordance with some aspects, the policies are received from a gateway or another device. The policies are applied to user sessions and a user service is provided based, in part, on the policies. The tracking component 104 is configured to monitor a first set of data 106 of a first user session 108. A cache component 110 is configured to dynamically retain the first set of data 106. The tracking component 104 (or another component) is further configured to monitor a second (or subsequent) user session 112. The first user session 108 and the second (or subsequent) user session 112 are associated with the same user/user device. For example, the first user session 108 can be a voice service and the second user session 112 can be a data service.

In accordance with some aspects, as a function of the monitoring, a utilization component 114 is configured to obtain the first set of data 106 of the first user session 108 and apply the first set of data 106 to the second user session 112. However, in accordance with some aspects, the first set of data 106 is not applied to the second user session 112, instead, a second set of data 116 associated with the second user session 112 is retained by cache component 110.

An interface component 118 is configured to communicate the first set of data 106 and/or the second set of data 116 to one or more managed mobile services. For example, the data can be communicated to the one or more network entities 100. However, in accordance with some aspects, the data is communicated to one or more network elements 120 (sometimes referred to as Policy Access Gateways).

The interface component 118 is further configured to receive policy and other state information from other network elements, such as network entities 100 and/or network elements 120 (e.g., network elements located in a different geographic region of the network). For example, a user device is moved into the geographic area being serviced by a communications apparatus 122 that includes tracking component 104, cache component 110, utilization component 114, and/or interface component 118. In this case, information related to the state of one or more services provided to the user device can be communicated to interface component 118 (e.g., from another network element 120, as will be discussed in further detail below). In such a manner, utilization component 114 can apply the state or network condition to the user device in order to further customize the application dynamically and provide a positive user experience.

The communications apparatus 122 can be, for example, a network node, network element or network entity. In accordance with some aspects, the communications apparatus 122 (sometimes referred to herein as a Policy Access Gateway (PAG)) can be configured to perform various functions usually performed by a Diameter Routing Agent (DRA), as defined by the Third ($3^{rd}$) Generation Partnership (3GPP). In addition to the standard DRA functions, the communications apparatus 122 is configured to perform functions for processing policies. According to some aspects, the communications apparatus 122 is configured to perform both DRA functions as well as additional functions for policy processing. Further, the communications apparatus 122 can be configured to retain state and session information.

In accordance with some aspects, the communications apparatus 122 is configured as a centralized mechanism to obtain, cache, and share dynamic policy information within a network. Thus, the state and other policy information can be cached and shared among other communication apparatuses (or PAGs). Such sharing of information can also be utilized in order to provide redundancy within the network. For example, the communications apparatus 122 can provide primary support for network elements within a certain geographic region. Further, since information related to network elements within another geographic region have been communicated to (or shared with) the communications apparatus 122, the communications apparatus 122 can provide secondary support for user devices arriving from the other geographic region(s).

In an embodiment, the communication system illustrated by FIG. 1 can differ in operation from a conventional communication system in order to provide additional benefits over those achievable by systems that employ a non-scalable policy deployment architecture. For instance, the communication systems disclosed herein are scalable and can be deployed in a very large network that support hundreds of millions of users.

Figure 2:
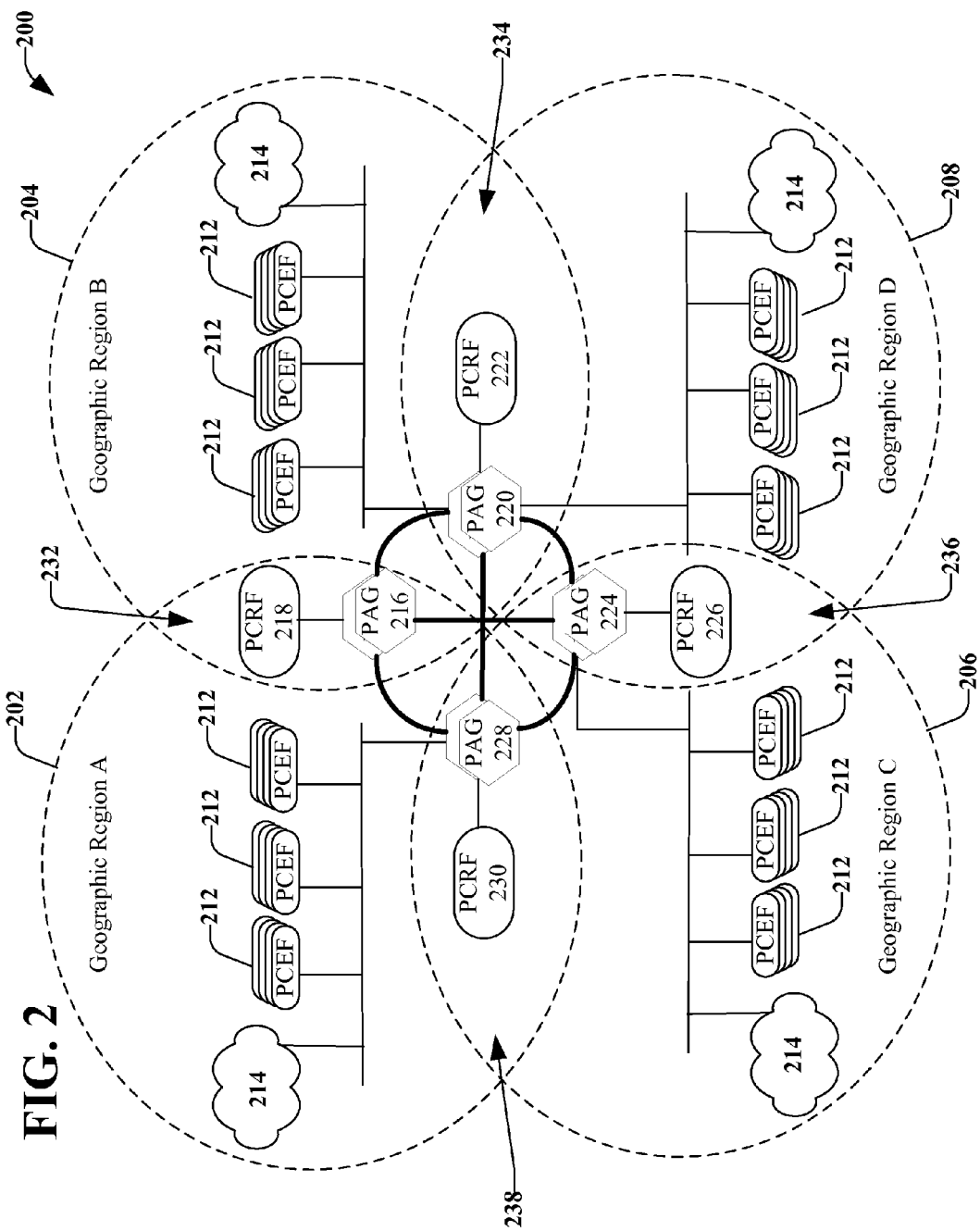
FIG. 2 illustrates a non-limiting example of a distributed architecture for a network element, such as a policy access gateway, according to an example.

FIG. 2 illustrates a non-limiting example of a distributed architecture 200 for a network element, according to an example. For purposes of explanation, the network element might be referred to herein as a policy access gateway or a PAG, however, it is to be understood that the disclosed aspects are not to be limited to this terminology and other terminologies can be utilized according to an aspect. The distributed architecture 200 depicts a geographic distribution of a policy function for a network. The distributed policy server architecture operates as a service provider for policy enforcement points that can support a multitude (e.g., millions) of users' base covering a large geographic area (e.g., a city, a state, a country, and so forth). The geographic distribution can provide geographic redundancy to allow a policy to be used as a network service for application functions and other policy consumers in various service ecosystems.

Illustrated are four geographic regions, represented by the dashed ovals and labeled Geographic Region A 202, Geographic Region B 204, Geographic Region C 206, and Geographic Region D 208. The Geographic Regions represent policy service geographic region distribution and, due to the overlapping nature of the Geographic Regions can provide operation redundancy. Although only four Geographic Regions are illustrated and described, a communication network can include fewer or more Geographic Regions.

Included in each Geographic Region are a multitude of PCEFs 212 as well as Application Functions (AF) and other policy consumers 214. The PCEFs 212 and AF and other policy consumers 214 interface with Policy Access Gateways (PAGs). The PAGs track and correlate user session(s) state and point to an active policy record information in a corresponding PCRF. For example, PAGs 216 points to an active policy record in PCRF 218, PAGs 220 points to an active policy record in PCRF 222, PAGs 224 points to PCRF 226, and PAGs 228 points to PCRF 230.

An AF is an element offering applications that need dynamic policy and/or charging and control over an IP-Connectivity Access Network (IP-CAN) user plane behavior. The AF can receive an indication that the service information is not accepted by a PCRF together with service information that the PCRF would accept. In that case, the AF rejects the service establishment to the user equipment (or user device). If possible, the AF can forward to the user equipment an indication of the service information that the PCRF would accept. The AF may communicate with multiple PCRFs and contact the appropriate PCRF based on either an end user IP Address and/or a user equipment identity of which the AF is made aware.

In accordance with some aspects, each PAG is configured to provide primary support for a first geographic region and, at substantially the same time, provide secondary support for at least a second geographic region, wherein a portion of the geographic regions overlap. For example, Geographic Region A 202 and Geographic Region B 204 overlap at 232. Geographic Region B 204 and Geographic Region D 208 overlap at 234. Geographic Region D 208 and Geographic Region C 206 overlap, at 236. Further, Geographic Region C 206 and Geographic Region A 202 overlap, at 238.

The PAGs 216, 220, 224, 228 communicate with each other, as shown by the dark lines connecting the PAGs. In accordance with some aspects, the PAGs communicate over a PAG Net, which is a secure and dedicated diameter signaling network backbone. The sharing of information between the PAGs can mitigate an amount of signaling related traffic and can enable routing decisions between network elements that are involved in policy and charging control (PCC) design paths.

Since the PAGs communicate with each other and can be located in areas of the Geographic Regions that overlap, each PAG can provide primary support for its Geographic Region and secondary support for at least one adjacent Geographic Region. For example, PAG 216 can provide primary support for Geographic Region A 202 and, if needed, can provide secondary support for Geographic Region B 204 and/or Geographic Region C 206. In a similar manner, PAG 220 can provide primary support for Geographic Region B 204 and can provide secondary support for Geographic Region D 208 (if PAG 224 is not available to provide primary support for Geographic Region D 208) and/or Geographic Region A 202. In a similar manner, PAG 224 can provide secondary support to Geographic Region C 206 (if PAG 228 is no longer available (or needs assistance) to provide support to Geographic Region C 206) and/or Geographic Region B. Further, PAG 228 can provide secondary support to Geographic Region A 202 and/or Geographic Region D 208. The geographic redundancy facilitates the use of a policy as a network service for application functions and other policy consumers 214.

Figure 3:
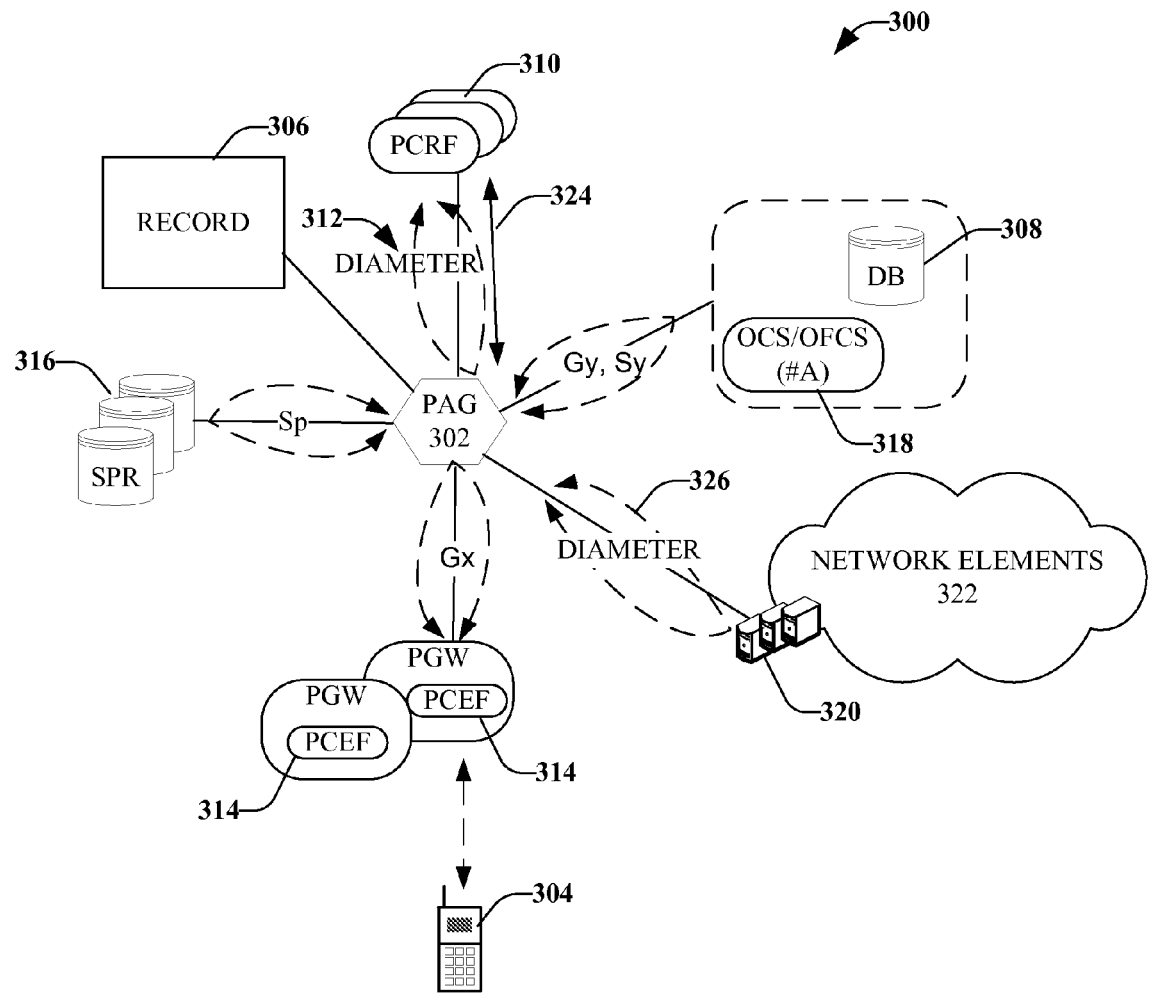
FIG. 3 illustrates a non-limiting example of a logical flow of policy information and policy service information tracking flow in a policy access gateway architecture, according to an aspect.

FIG. 3 illustrates a non-limiting example of a logical flow 300 of policy information and policy service information tracking flow in a PAG architecture, according to an aspect. A PAG 302 tracks and correlates one or more active user session states. Although a user session is illustrated as a particular type of mobile device 304, the disclosed aspects can be utilized with other devices and are not limited to this particular instance of a mobile device. The PAG 302 obtains information 306 related to a user session 304 from a data store 308. The information 306 obtained can include a session binding record for the mobile device 304. For example, the mobile device 304 can be associated with a Mobile Subscriber Integrated Services Digital Network Number (MSISDN), such as 1234567890. The mobile device 304 can also be associated with a first access point (or access point name (APN)) and a second access point or APN. Such as, for example, APN 1: Data and APN 2: Voice. By way of example, the information 306 obtained by the PAG 302 can include the following:

Session Binding Record for MSISDN1234567890:
PCEF=A(data), B(voice)
PCRF=X
SPR=Y
OCS/OFCS=A However, other information can be obtained by the PAG 302. The PAG 302 can also track the various information during the active user session state and, if applicable, the information 306 can be updated. For example, the information retained in data store 308 can be updated dynamically as changes occur.

The PAG 302 is also the pointer to active policy record information in a corresponding PCRF 310. The information is shared among all PAG instances. Such sharing can mitigate policy signaling related traffic. In some aspects, the sharing of information can enable more optimal routing decisions between each network element that is involved in PCC decision paths when multiple APNs are involved. This can provide offloading of the PCRF from the TPS perspective, which is a driver for PCRF scalability in a highly distributed network. This process is shown by the arrows at 312.

During an initial default bearer set up process, information related to various network entities is tracked and cached by PAGs. Examples of network elements include a policy decision engine (e.g., Policy Control and Charging Rules Function (PCRF) in 3GPP), a Policy and Charging Enforcement Function (PCEF 314), and Subscription Profile Repository (SRP 316). The policy decisions are generated by the policy decision engine. The PCEF examines packets passing though a gateway and enforces control and charging policy decisions on the packets. The SRP is a logical entity that includes all subscriber/subscription related information needed for subscription-based policies and IP-CAN (Internet Protocol Connectivity Access Network) bearer level charging rules by the PCRF. The SPR may be combined with or distributed across other data sores in the operator's network. The SPR may provide information including, but not limited to, Subscriber's allowed services, Information on subscriber's allowed QoS, Subscriber's charging related information, and Subscriber category. Another example, of a network element whose information is tracked by the PAG is an On-Line Charging System and an Off-Line Charging System (OCS/OFCS 318)

The binding record can be updated during the second default bearer setting up process. Thus, there is no need to signal again to the PCRF 310, SPR 316, and/or OCS/OFCS 318. Direct packet replay can occur for the second default bearer, which can mitigate the amount of signaling needed. This binding information tied to policy can provide complex services that utilize resources from different network nodes in that all policy related information and session state information are cached in the PAG 302. The information can be readily available to these network nodes without each network node needing to have to cache part of the information.

Additionally, the PAG can provide the information to other internal network elements as a service to the internal network elements.

In accordance with some aspects, the PAG 302 can export the session related dynamic data into a gateway 320. As needed, other network elements 322 that need policy and user session information can access the data. The paths related to session discovery and policy information sharing for active users are illustrated by arrows 324 and 326. The other arrows indicate the paths involved in session creating and binding set up.

Figure 4:
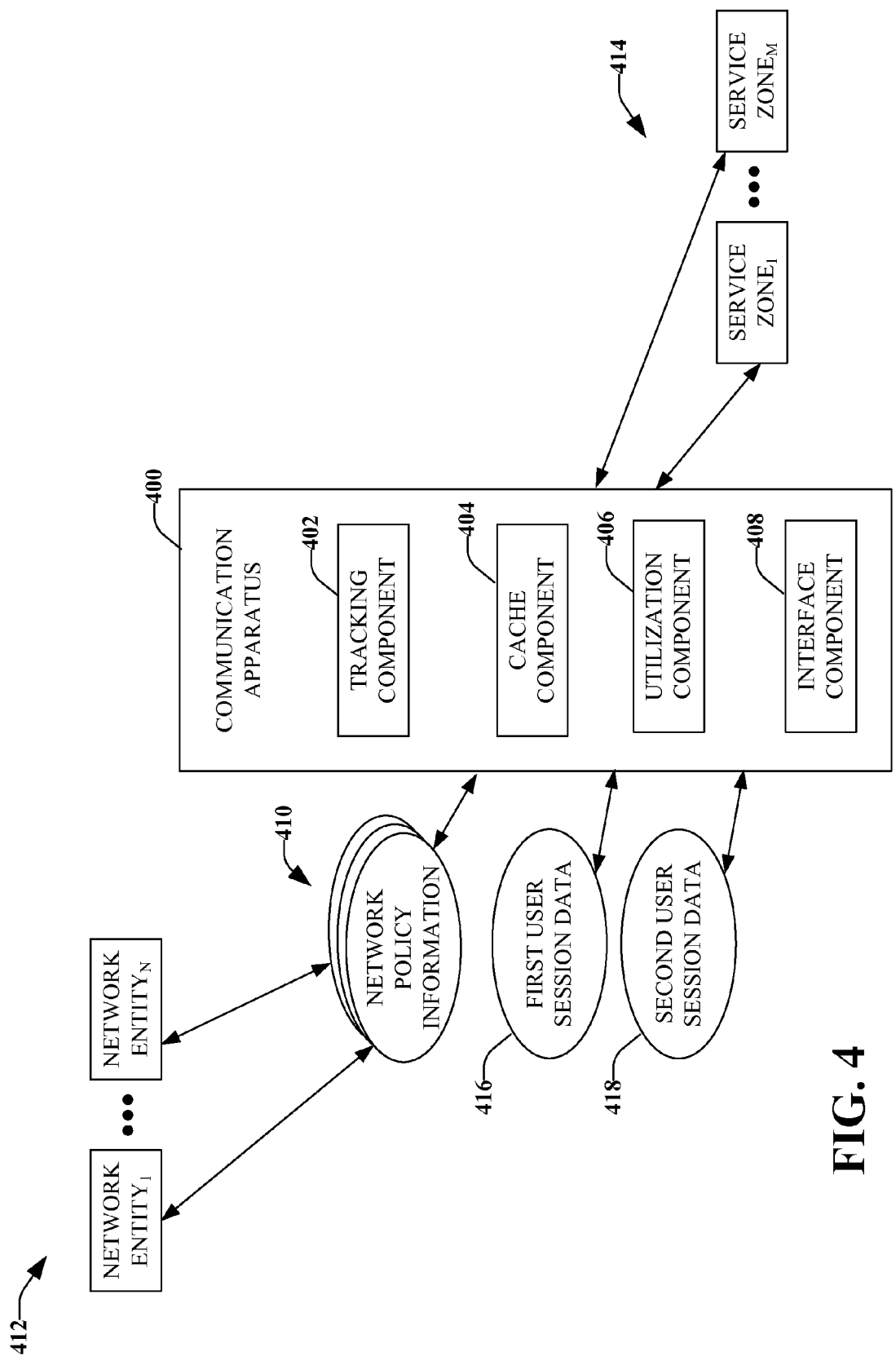
FIG. 4 is a block diagram showing a communication apparatus, according to an aspect.

Illustrating other aspects, FIG. 4 is a block diagram showing a communication apparatus 400, according to an aspect. The communication apparatus 400 is configured to obtain, cache, and share dynamic policy information in a communications network. Caching all the information in a single entity, mitigates the amount of signaling needed to obtain the information (as compared to when the information needs to be obtained from multiple entities). In some aspects, the communication apparatus 400 is a network element or a Policy Access Gateway (PAG) that is included in a geo-diversified architecture to provide large scale deployment.

The communication apparatus 400 retains state and other policy record information and caches the information, which can allow the information to be shared among other network entity instances (e.g., other PAGs). The sharing of the information can mitigate policy signaling related traffic when multiple APNs are involved. For example, user session and policy information can be shared within a telecom network, which can enable the centralized management of policy related information in the network and also share and serve the information with network elements.

Communication apparatus 400 comprises a tracking component 402, a cache component 404, a utilization component 406, and an interface component 408. The interface component 408 (or another component) is configured to obtain network policy information 410 from a multitude of network entities 412, labeled as network entity$_1$ through network entity$_N$, where N is an integer. Each of the network entities 412 can perform a different function, or subsets of the network entities can perform different functions, wherein a subset, as used herein comprises one or more network entities. For example, a first subset of network entities can perform a first function, a second subset of network entities can perform a second function, a third subset of network entities can perform a third function, and so on.

The communications apparatus 400 also comprises a component that is configured to provide routing between the network entities 412 and a multitude of service zones 414, labeled as service zone$_1$ though service zone$_M$, where M is an integer. In an example, the routing between the network entities 412 and the multitude of service zones 414 might have previously been performed by a Diameter Routing Agent (DRA), according to conventional deployment architectures. However, in accordance with the disclosed aspects, the routing is performed by the communications apparatus 400 (or PAG). In accordance with some aspects, service zones 414 comprise five or more service zones, wherein the communications apparatus 400 further provides routing between the network entities 412 and the five or more service zones 414.

According to some aspects, communication apparatus 400 can be located within a first geographic region and can be within one or more other geographic regions (e.g., the geographic regions comprise a common area). Thus, the communications apparatus 400 can be configured to provide direct support for the first geographic area and indirect support for the second geographic area.

The tracking component 402 is configured to monitor a first user service activity or a first user session data 416 for a user device (or user equipment). The tracking component 402 is also configured to monitor a second user session data 418. The first user session data 416 and the second user session data 416 are associated with a user device. For example, the first user session data 416 can be related to voice and the second user session data 418 can be related to data, however, the disclosed aspects are not limited to this example.

The user session data or user service activity can comprise a first activity for the user device and a second activity for the user device. According to some aspects, the first user service activity comprises a plurality of services provided to one user device. In an aspect, the first user service activity comprises different network elements that provide the user service activities.

The cache component 404 is configured to retain the state of the first user session data 416 and/or the state of the second user session data 418. Retaining the state(s) can allow the state(s) to be dynamically accessible by communications apparatus 400 or another network element. For example, the state can be retained in an internal storage media and/or an external storage media (e.g., a data store). The information retained in the data store or other storage media can be accessed by communication apparatus 400 and/or another device or network element that needs to utilize the information (e.g., a PAG located in a different geographic area that is to provide service for the user device).

The utilization component 406 is configured to selectively apply the first user session data 416 to the second user session, if the data is useful for the second user session. Additionally or alternatively, the utilization component 406 is configured to apply the first user session data 416 and/or the second user session data 418 to a subsequent user session.

In accordance with some aspects, the utilization component 406 is configured to receive or obtain user session data from another network entity and apply the user session data to a session executing on a user device that has moved into a geographic region served by communication apparatus 400. For example, utilization component 406 can access a data store in which the other network entity stored the user session data when the device was located in a geographic area served by the network entity.

The interface component 408 is configured to communicate the first state of the first user session data 416 to a plurality of managed mobile services. In some aspects, the interface component 408 is configured to push session record information to at least one gateway for authorized access. For example, the session record information can be provided to at least one of a network element, an application, a resource, or another gateway.

In an aspect, the first state of the first user session data 416 is communicated to one or more PAGs located within various geographic regions of a communications network. Such PAGs can provide secondary support for network elements and devices located within a geographic region of communications apparatus 400.

Figure 5:
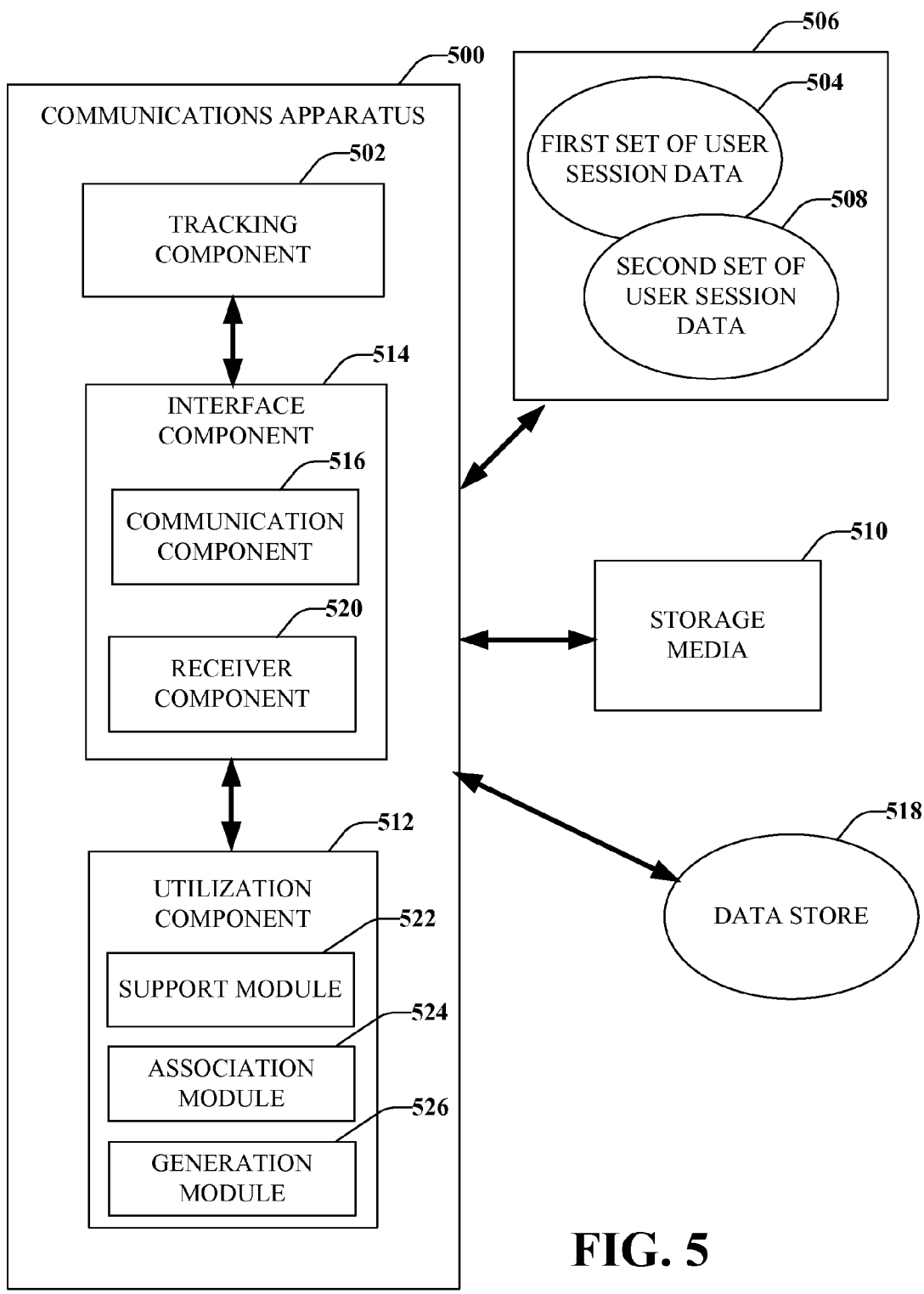
FIG. 5 illustrates a block diagram showing another embodiment of a communication apparatus, according to an aspect.

FIG. 5 illustrates a block diagram showing another embodiment of a communication apparatus 500, according to an aspect. Communications apparatus 500 can be a Policy Access Gateway (PAG) or another network element, in accordance with one or more of the disclosed aspects. Included in communications apparatus 500 is a tracking component 502 that is configured to track a first set of user session data 504 associated with a user device 506. The tracking component 502 is also configured to track one or more other sets of user session data 508 associated with the user device 508.

Also associated with communications apparatus 500 is a storage media 510 that is configured to, at least temporarily, cache the first set of user session data 504 and/or the second (or subsequent) set of user session data 508. While shown as being external to communications apparatus 500, it is to be understood that the storage media 510 may be contained, at least partially, within communications apparatus 500.

In accordance with some embodiments, communications apparatus 500 comprises a utilization component 512 that is configured to apply the first set of user session data 504 or the second set of user session data 508 to a subsequent user session. In such a manner, the data previously obtained can be applied to a current session, which can mitigate an amount of signaling need to provide the current session.

Also included is an interface component 514 configured to receive and send information to/from various devices and/or network entities. For example, interface component 514 can include a communication component 516 configured to send the first set of user session data 504 and/or second set of user session data 508 to a data store 518. In accordance with some aspects, the communication component 516 is configured to push session record information to at least one gateway for authorized access (e.g., by a network element, an application, a resource, another gateway, and so forth).

Interface component 514 can also include a receiver component 520 configured to receive session data information from one or more network elements (e.g., PAGs). Session data information received can be used by a support module 522 that is configured to provide direct support for a first geographic area (e.g., area serviced by communications apparatus 500) and indirect support for a second geographic area (e.g., area serviced by one or more network elements. At least a portion of the first geographic area and the second geographic area comprise a common area.

In accordance with some aspects, utilization component 512 comprises an association module 524 that is configured to associate the first set of user session data 504 with policy record information. In some aspects, the utilization component 512 comprises a generation module 526 that is configured to create a session record that comprises an identification of a mobile device and associated network elements.

According to some aspects, communications apparatus 500 is configured to hide a topology from a roaming partner (or roaming network), such as though utilization of support module 520. For example, the roaming partner communicates with the communication apparatus 500 in order to support a roaming mobile device. The communications apparatus 500 communicates with the various network elements (e.g., PCEF, PCRF, and so forth) on behalf of the roaming partner. Thus, the details of the topology in which communications apparatus 500 is included is hidden from the roaming partner.

Figure 6:
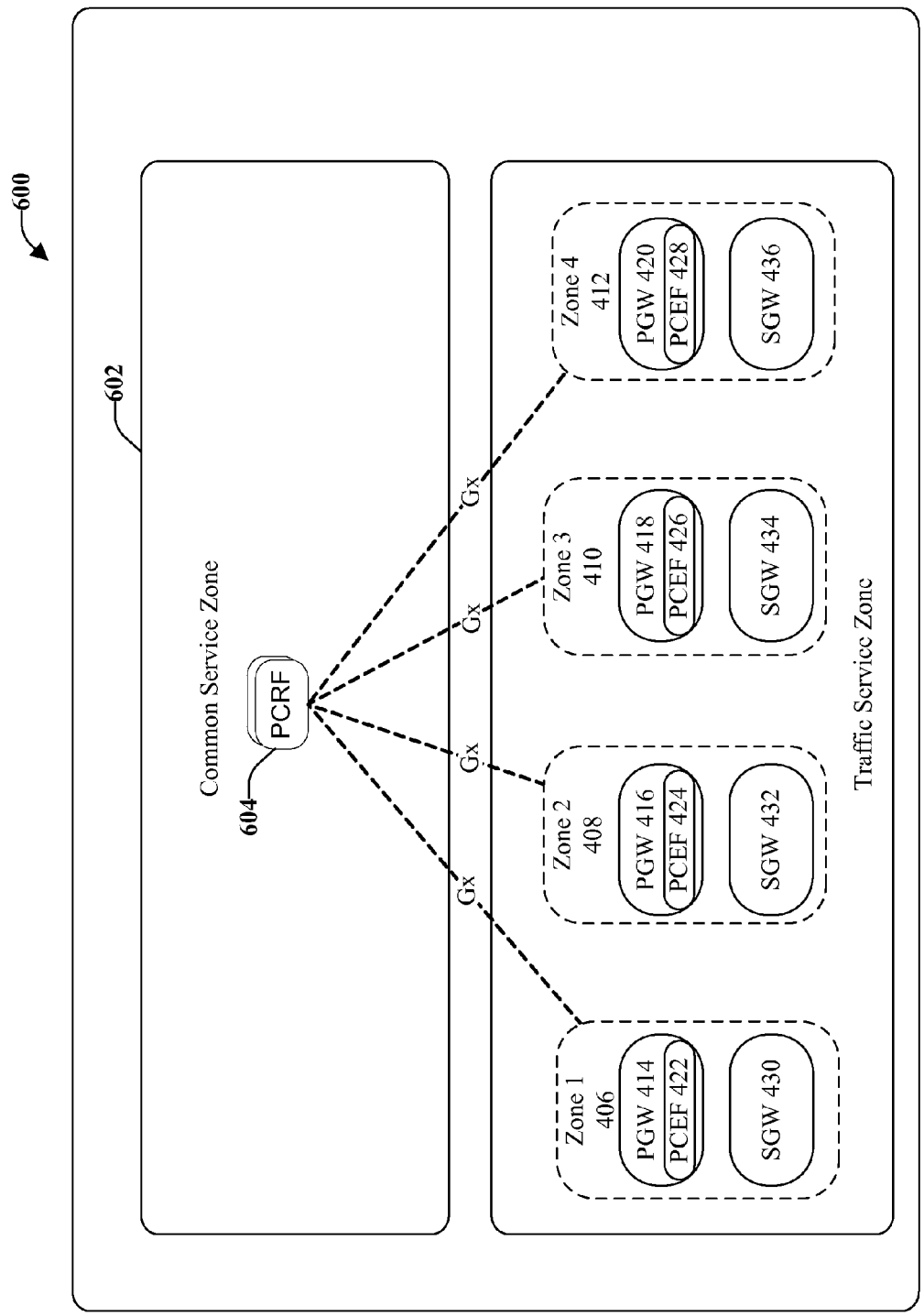
FIG. 6 illustrates a conventional network deployment architecture that does not incorporate the disclosed aspects.

To further describe the various aspects provided herein, FIG. 6 illustrates a conventional network deployment architecture 600 that does not incorporate the disclosed aspects. This architecture 600 can produce PCRF scaling problems. Included in the architecture 600 is a common service zone 602 that comprises one PCRF instance 604 in a national data center. The PCRF instance 604 is configured to support up to four traffic service zones, labeled as First Zone 606 (Zone 1), Second Zone 608 (Zone 2), Third Zone 610 (Zone 3), and Fourth Zone 612 (Zone 4). Thus, there is a one to four (1:4) relationship between the PCRF instance 604 and its service zones.

Each Zone comprises a PGW 614-620, which comprises a PCEF 622-628, and a Serving Gateway (SGW) 630-636. A policy session bind correlation and load balancing between the PCRF 604 and PCEF 616 are achieved though a pre- defined static configurations on each side. To support additional traffic service zones, additional PCRFs need to be added since the PCRF might have difficulty to support more than four service zones (per the 1:4 ratios) due to increasing traffic for voice services that might use more policy signaling to set up dedicated bearers for voice sessions. This scaling mechanism can present operational challenges as additional data centers are created within the communication network.

Figure 7:
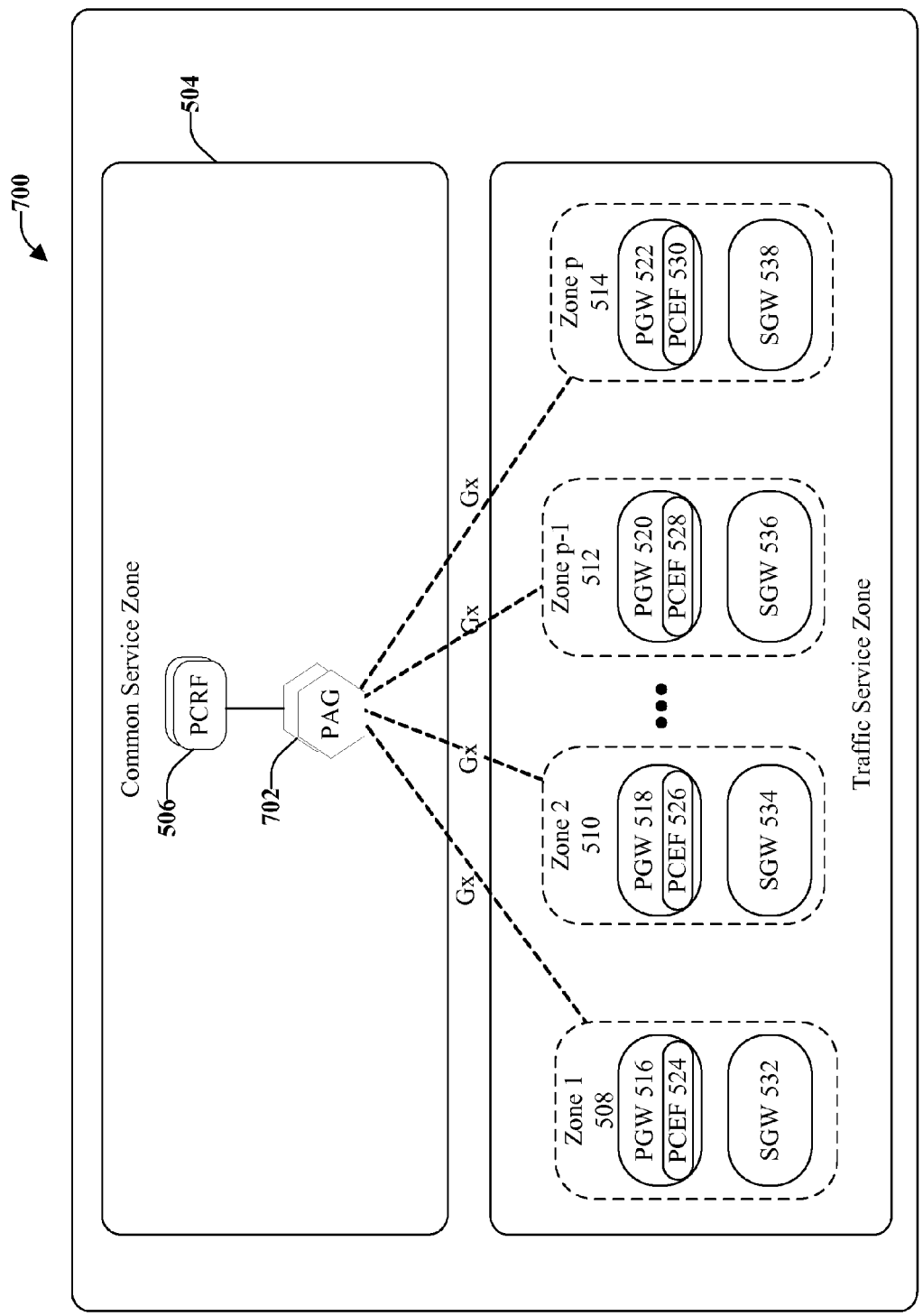
FIG. 7 illustrates a scalable deployment architecture, according to an aspect.

To overcome the scaling problem, FIG. 7 illustrates a scalable deployment architecture 700, according to an aspect. As illustrated, a PAG 702 (e.g., communication apparatus 112 of FIG. 1) is included in the deployment architecture 700. In accordance with some aspects, the PAG 702 can be based on RFC 3588 and relevant 3GPP standards for policy and charging control, which are incorporated herein by reference. Alternatively, the disclosed aspects do not depend on the 3GPP standard and other embodiments of the disclosed architecture apply to principles of the disclosed aspects in an architecture not fully compliant with 3GPP.

As illustrated, the PAG 702 can reside in a common service zone 704 and can interface with a PCRF 706. The PAG 702 can also interface with a plurality of service zones, labeled as a first zone 708 (Zone 1), a second zone 710 (Zone 2), and other zones up to zone p-1 712 and zone p 712, where p is an integer. Each zone comprises respective PGWs 716-722, PCEFs 724-730, and SGWs 732-738.

In accordance with some aspects, the PAG 702 performs functions similar to those of a Diameter Routing Relay and Proxy Agent for PCRF, as well as additional functions discussed herein. Thus, the PAG 702 can provide intelligent policy routing between PCEFs 724-730 and their managing PCRF 706 instance. Further, the PAG 702 allows P number of PCEFs to connect to their managing PCRF instance, which can provide large scale deployment flexibility. For example, zones can be added without the need to add additional PCRFs.

Figure 8:
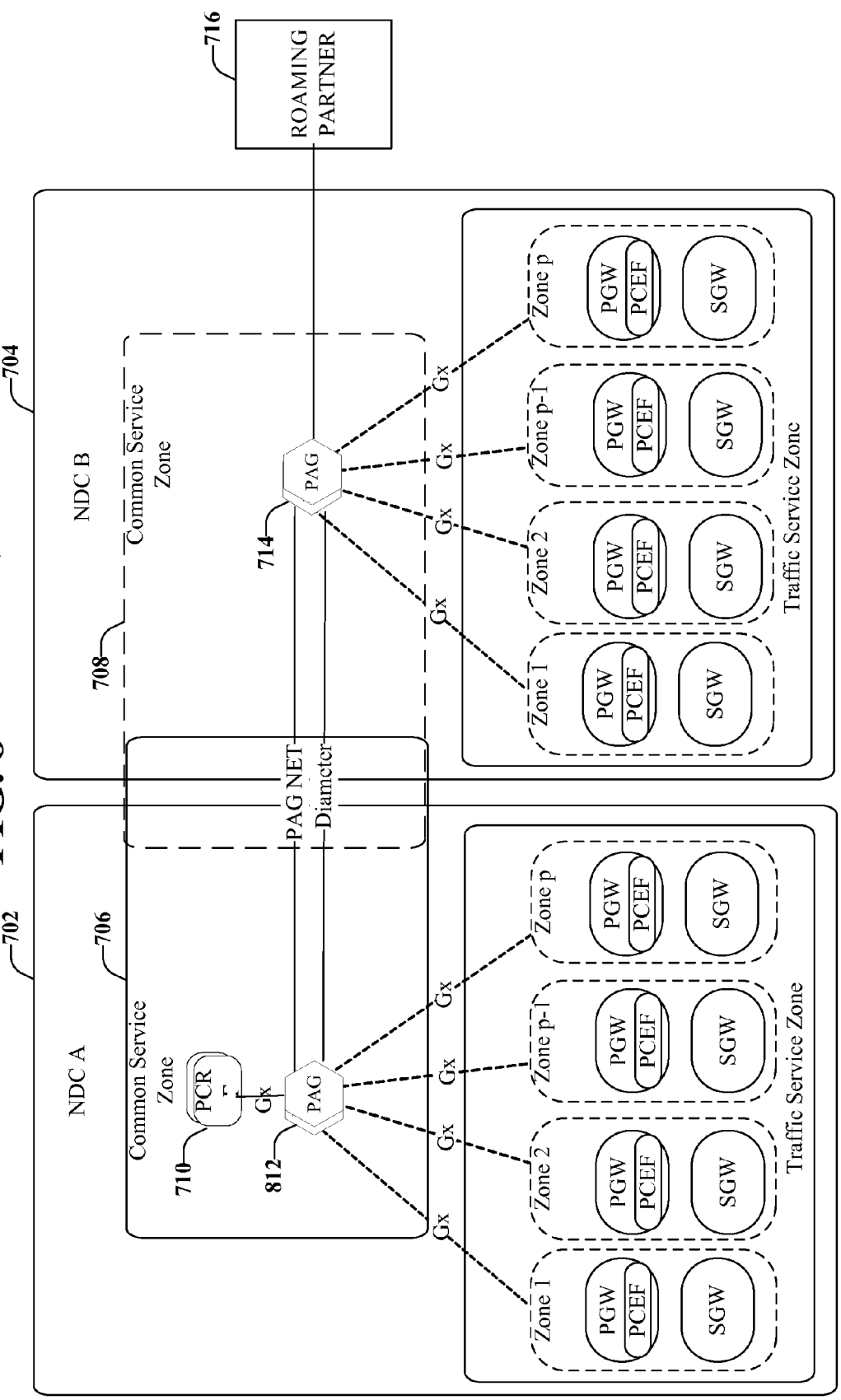
FIG. 8 illustrates a deployment architecture that comprises multiple geographical locations, according to an aspect.

FIG. 8 illustrates a deployment architecture 800 that comprises multiple geographical locations, according to an aspect. The deployment architecture 800 can comprise two or more National Data Centers (NDC), illustrated as NDC A 802 and NDC B 804. Each NDC comprises a common service zone 806, 808, wherein at least a portion of the common service zones 806, 808 overlap. However, only common service zone 806 comprises a PCRF 810. The PCRF 810 communicates with PAG 812 and PAG 814. Each PAG 812, 814 supports a multitude of Zones, Labeled Zone 1, Zone 2, through Zone p-1, and Zone p. Due to the overlap in at least a portion of the geographic region supported by the common service zones 806, 808, there can be redundancy. For example, PAG 812 can be a primary PAG for the common service zone 806. Further, since the PAG 812 can be provided information related to common service zone 808, PAG 812 can be a secondary PAG for common service zone 808. In such a manner, if PAG 814 becomes unavailable, PAG 812 can perform various services on behalf of PAG 814.

Thus, the disclosed aspects can provide PCRF scaling for PCEF, where PCRF is not located in the same NDC with the PCEFs. The PCRF can provide policy and charging control for PCEFs from P number of traffic service zones in different NDC PAG-networks, which is a globally routable, secured, and dedicate network for PAG signaling for routing policy traffic.

By way of example and not limitation, policy based routing supporting PCRF scaling and policy geographic distribution (flexible deployment architecture (FIGS. 7 and 8) can be configured to provide support for standard policy routing functions.

In another example, the disclosed aspects can provide dynamic policy based transaction state tracking and management. This can provide a policy based tracking mechanism in addition to simple standard routing. With this mechanism, the network can keep track of the sessions between any network nodes for all subscribers and for each user's current services and the network elements that provide the services. With this intelligence, dynamic and customized services becomes possible.

In accordance with some aspects, the disclosed aspects can support a roaming scenario. Thus, when a user device enters the visiting network, instead of communicating to a specific PCRF (e.g., PCRF 810), the user device communicates with the PAG. For example, PAG 814 can communicate with a roaming partner 816. PAG 814 has the information and provides the information to the PCRF 810. In such a manner, the PAG is configured to hide the topology from outsiders (e.g., roaming partner 816), which is not aware which PCRF is being utilized. Thus, the PAG operates as a hiding entity.

Figure 9:
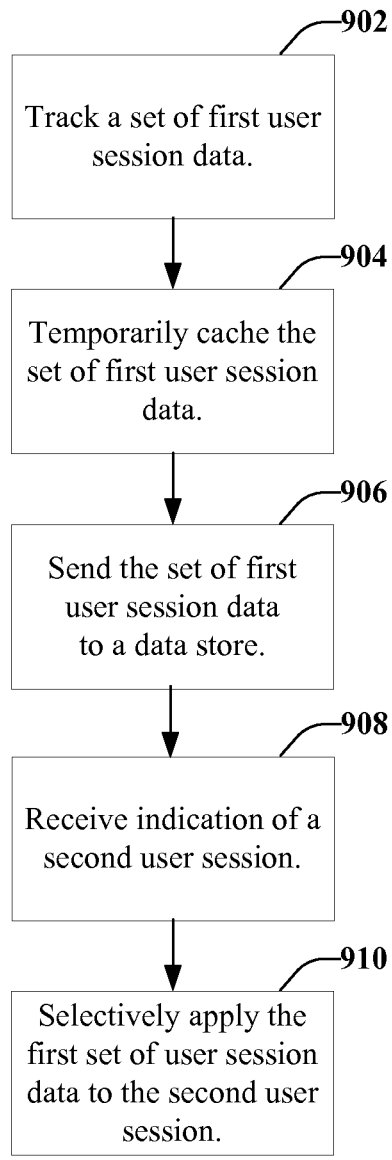
FIG. 9 illustrates a flow chart for utilizing policy as a network service, in accordance with an aspect.

FIG. 9 illustrates a flow chart for utilizing policy as a network service, in accordance with an aspect. At 902, a set of first user session data is tracked. The first user session data is associated with a first user session for a user device. For example, information related to a session (e.g., policies, rules, and so forth) can be retrieved from a data store. Based on the information, a session can be established and the first set of user session data tracked. Data in the set of first user session data can include a Mobile Station International Subscriber Directory Number (MSISDN), which PCEF holds the session for a particular service, which PCRF has the policy, which data store has the particular user's profile, which charging functions (e.g., prepaid, smart limit, and so forth) should be utilized, and so on.

The first time the user device accesses the network, there is signaling in order to provide network access. Once the user device is provided network access, the information is cached, at 904. This information can be cached temporarily, such as during a current session. The caching of information can be dynamic.

At 906, the set of first user session data is sent to a data store. In the future, if any network element needs information related to the set of first user session data, the information is retrieved from the data store. In such a manner, when a network session is to be established, the information can be retrieved from the data store, which can mitigate the need to request or gather the information from multiple network elements. Thus, subsequent signaling can be mitigated.

According to some aspects, the set of first user session data is associated with policy record information. Further, session record information of the set of first user session data can be pushed to at least one gateway for authorized access. In accordance with some aspects, pushing the session record information can include providing the session record information to at least one of a network element, an application, a resource, or another gateway. The authorized access can be obtained by at least one of a network element, an application, a resource, or another gateway.

According to some aspects, the method comprises generating a session record for the set of first user session data. The session record comprises an identification of the user device and associated network elements.

In accordance with some aspects, method 900 can continue, at 908, when an indication of a second session for the user device is received. At 910, the set of first user session data is selectively applied to the second user session. For example, the set of first user session data can be applied to the second user session, mitigating an amount of signaling needed to establish the second user session. According to other aspects, the set of first user session data is not applied to the second user session. Instead, a set of second user session data is captured from the second session, dynamically cached, and saved to the data store. The first user session data and/or second user session data can be retrieved when a subsequent user session is to be established for the user device.

For example, the first set of user session data and/or second set of user session data can be captured within a first geographic region and communicated to a network element in a second geographic region as a function of movement of the user device from the first geographic region into the second geographic region. The second geographic region extends into at least a portion of the first geographic region. A network element serving the second geographic region can obtain the session data information from the data store, even though the session data information was captured and retained by a different network element.

In an aspect, the method further comprises providing routing between network entities and five or more service zones.

According to some aspects, method can include communicating with a roaming network. The communication can be on behalf of a network entity, such as a PCRF. Communicating with the roaming network can hide a network topology from the roaming network.

In such a manner, backup support can be provided to the user device. Such sharing of information can mitigate the amount of signaling needed to service the user device in the second geographic area, which can provide a positive user experience.

Exemplary Networked and Operating Environments

In one embodiment, a computer-readable storage medium comprises computer-executable code instructions stored therein, wherein in response to execution by at least one processor, the computer-executable code performs operations comprising tracking user service activities with respect to a wireless communication network and correlating the user service activities to different combinations of network nodes that support the user service activities. The user service activities can comprise a first activity for a first user equipment and a second activity for a second user equipment. In accordance with some aspects, the user service activities comprise a plurality of services provided to one user equipment. According to some aspects, the user service activities comprise different network elements that provide the services. The operations can also comprise providing routing between network entities and a plurality of service zones, receiving network policy information from the network entities with different functions, and managing the plurality of service zones based on the network policy information, wherein the managing is performed on behalf of the network entity.

Figure 10:
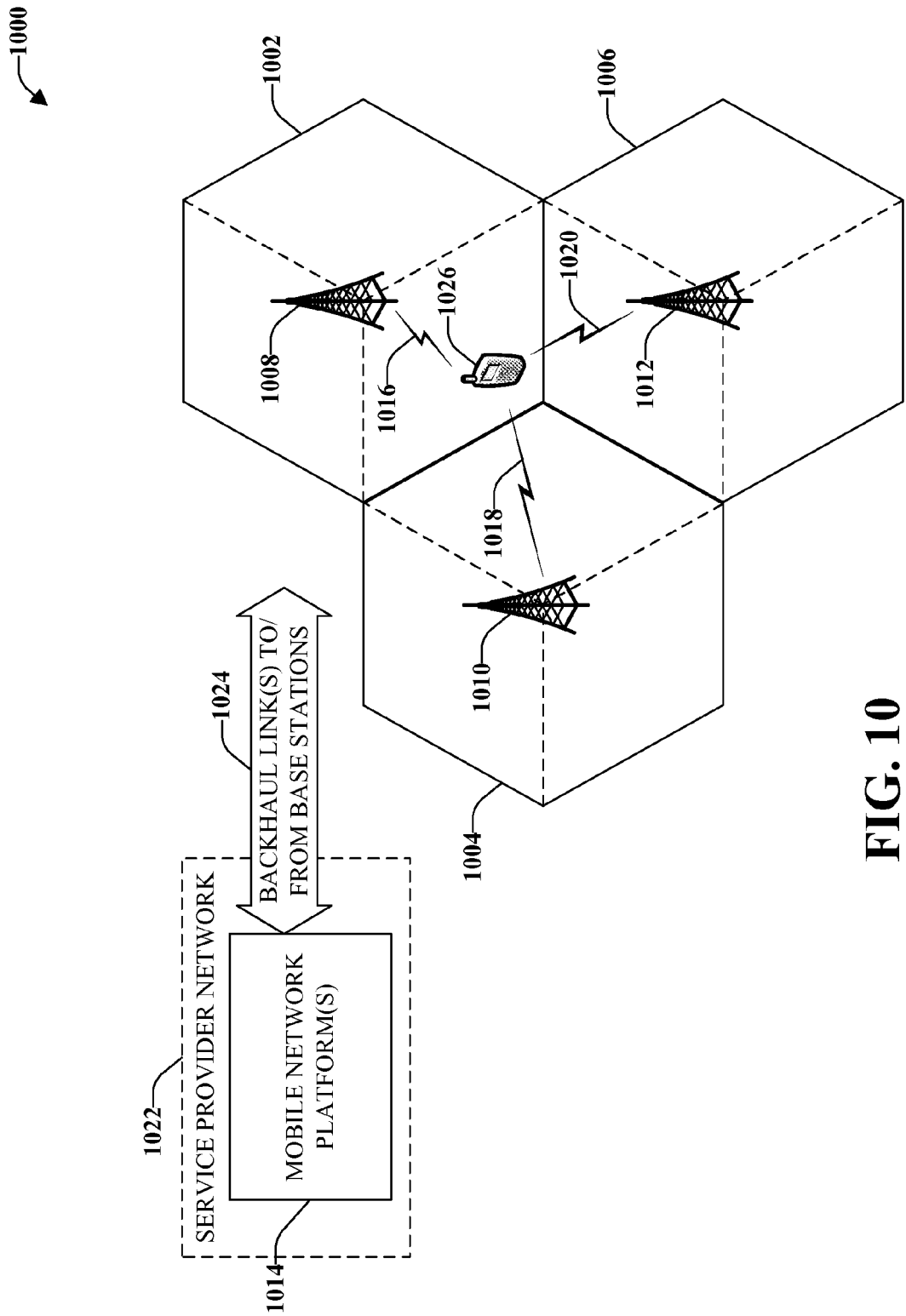
FIG. 10 is a schematic example wireless environment that can operate in accordance with aspects described herein.

By way of further description with respect to one or more non-limiting ways to provide scalable policy deployment, FIG. 10 is a schematic example wireless environment 1000 that can operate in accordance with aspects described herein. In particular, example wireless environment 1000 illustrates a set of wireless network macro cells. Three coverage macro cells 1002, 1004, and 1006 comprise the illustrative wireless environment; however, it should be appreciated that wireless cellular network deployments can encompass any number of macro cells, for example, 1004-1005 coverage macro cells. Coverage macro cells 1002, 1004, and 1006 are illustrated as hexagons; however, coverage cells can adopt other geometries generally dictated by a deployment configuration or floor plan, geographic areas to be covered, and so on. Each macro cell 1002, 1004, and 1006 is sectorized in a $2\pi/3$ configuration in which each macro cell includes three sectors, demarcated with dashed lines in FIG. 10. It should be appreciated that other sectorizations are possible, and aspects or features of the disclosed subject matter can be exploited regardless of type of sectorization. Macro cells 1002, 1004, and 1006 are served respectively through base stations or eNodeBs 1008, 1010, and 1012. Any two eNodeBs can be considered a eNodeB site pair (NBSP). It is noted that radio component(s) are functionally coupled through links such as cables (e.g., RF and microwave coaxial lines), ports, switches, connectors, and the like, to a set of one or more antennas that transmit and receive wireless signals (not illustrated). It is noted that a radio network controller (not shown), which can be a part of mobile network platform(s) 1014, and set of base stations (e.g., eNode B 1008, 1010, and 1012) that serve a set of macro cells; electronic circuitry or components associated with the base stations in the set of base stations; a set of respective wireless links (e.g., links 1016, 1018, and 1020) operated in accordance to a radio technology through the base stations, form a macro radio access network (RAN). It is further noted, that based on network features, the radio controller can be distributed among the set of base stations or associated radio equipment. In an aspect, for UMTS-based networks, wireless links 1016, 1018, and 1020 embody a Uu interface (UMTS Air Interface).

Mobile network platform(s) 1014 facilitates circuit switched (CS)-based (e.g., voice and data) and packet-switched (PS) (e.g., internet protocol (IP), frame relay, or asynchronous transfer mode (ATM)) traffic and signaling generation, as well as delivery and reception for networked telecommunication, in accordance with various radio technologies for disparate markets. Telecommunication is based at least in part on standardized protocols for communication determined by a radio technology utilized for communication. In addition telecommunication can exploit various frequency bands, or carriers, which include any EM frequency bands licensed by the service provider 1022 (e.g., personal communication services (PCS), advanced wireless services (AWS), general wireless communications service (GWCS), and so forth), and any unlicensed frequency bands currently available for telecommunication (e.g., the 2.4 GHz industrial, medical and scientific (IMS) band or one or more of the 5 GHz set of bands). In addition, mobile network platform(s) 1014 can control and manage base stations 1008, 1010, and 1012 and radio component(s) associated thereof, in disparate macro cells 1002, 1004, and 1006 by way of, for example, a wireless network management component (e.g., radio network controller(s), cellular gateway node(s), etc.) Moreover, wireless network platform(s) can integrate disparate networks (e.g., femto network(s), Wi-Fi network(s), femto cell network(s), broadband network(s), service network(s), enterprise network(s), and so on). In cellular wireless technologies (e.g., 3rd Generation Partnership Project (3GPP) Universal Mobile Telecommunication System (UMTS), Global System for Mobile Communication (GSM)), wireless network platform 1014 is embodied in a core network and a set of radio network controllers.

In addition, wireless backhaul link(s) 1024 can include wired link components like T1/E1 phone line; a digital subscriber line (DSL) either synchronous or asynchronous; an asymmetric DSL (ADSL); an optical fiber backbone; a coaxial cable, etc.; and wireless link components such as line-of-sight (LOS) or non-LOS links which can include terrestrial air-interfaces or deep space links (e.g., satellite communication links for navigation). In an aspect, for UMTS-based networks, wireless backhaul link(s) 1024 embodies IuB interface.

It should be appreciated that while exemplary wireless environment 1000 is illustrated for macro cells and macro base stations, aspects, features and advantages of the disclosed subject matter can be implemented in microcells, picocells, femto cells, or the like, wherein base stations are embodied in home-based access points.

Figure 11:
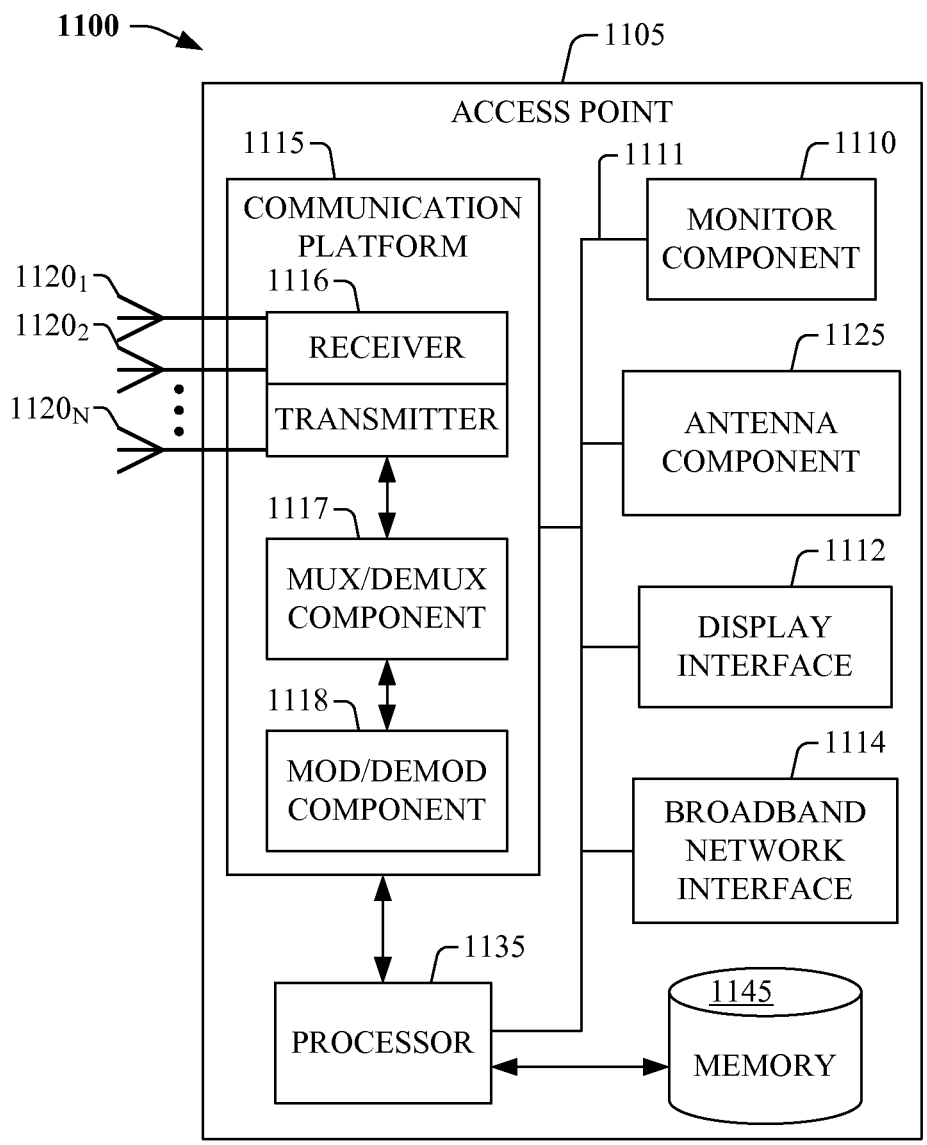
FIG. 11 illustrates a block diagram of an access point, in accordance with an embodiment.

To provide further context for various aspects of the disclosed subject matter, FIG. 11 illustrates a block diagram of an embodiment 1100 of an access point 1105, e.g., base station, wireless access point, femtocell access point, etc. that can enable and/or exploit features or aspects of the disclosed subject matter.

In embodiment 1100, access point 1105 can receive and transmit signal(s) from and to wireless devices, wireless ports, wireless routers, etc. through segments $1120_1$-$1120_N$ (N is a positive integer). Segments $1120_1$-$1120_N$ can be internal and/or external to access point 1105, and can be controlled by (1) monitor component 1110 and (2) antenna component 1125. Further, monitor component 1110 and antenna component 1125 can couple to communication platform 1115, which comprises electronic components and associated circuitry that provide for processing and manipulation of received signal(s) and other signal(s) to be transmitted.

In an aspect, communication platform 1115 includes a receiver/transmitter 1116 that can convert analog signals to digital signals upon reception of the analog signals, and convert digital signals to analog signals upon transmission. In addition, receiver/transmitter 1116 can divide a single data stream into multiple, parallel data streams, or perform the reciprocal operation. Coupled to receiver/transmitter 1116 is a multiplexer/demultiplexer 1117 that facilitates manipulation of signals in time and frequency space. Electronic component 1117 can multiplex information (data/traffic and control/signaling) according to various multiplexing schemes such as time division multiplexing (TDM), frequency division multiplexing (FDM), orthogonal frequency division multiplexing (OFDM), code division multiplexing (CDM), space division multiplexing (SDM). In addition, mux/demux component 1117 can scramble and spread information, e.g., codes, according to substantially any code known in the art, e.g., Hadamard-Walsh codes, Baker codes, Kasami codes, polyphase codes, etc. A modulator/demodulator 1118 is also a part of communication platform 1115, and can modulate information according to multiple modulation techniques, such as frequency modulation, amplitude modulation, e.g., M-ary quadrature amplitude modulation (QAM), with M a positive integer); phase-shift keying (PSK); etc.

Access point 1105 also includes a processor 1135 configured to confer, at least in part, functionality to substantially any electronic component in access point 1105. In particular, processor 1135 can facilitate configuration of access point 1105 via, e.g., monitor component 1110, antenna component 1125, and one or more component therein. Additionally, access point 1105 can include display interface 1112, which can display functions that control functionality of access point 1105, or reveal operation conditions thereof. In addition, display interface 1112 can include a screen to convey information to an end user. In an aspect, display interface 1112 can be an LCD (Liquid Crystal Display), a plasma panel, a monolithic thin-film based electrochromic display, and so on. Moreover, display interface 1112 can also include a component (e.g., speaker) that facilitates communication of aural indicia, which can also be employed in connection with messages that convey operational instructions to an end user. Display interface 1112 can also facilitate data entry e.g., through a linked keypad or via touch gestures, which can cause access point 1105 to receive external commands, e.g., restart operation.

Broadband network interface 1114 facilitates connection of access point 1105 to a service provider network (not shown) that can comprise one or more cellular technologies (e.g., 3GPP UMTS, GSM, etc.) via backhaul link(s) (not shown), which enable incoming and outgoing data flow. Broadband network interface 1114 can be internal or external to access point 1105, and can utilize display interface 1112 for end-user interaction and status information delivery.

Processor 1135 can be functionally connected to communication platform 1115 and can facilitate operations on data, e.g., symbols, bits, or chips, for multiplexing/demultiplexing, such as effecting direct and inverse fast Fourier transforms, selection of modulation rates, selection of data packet formats, inter-packet times, etc. Moreover, processor 1135 can be functionally connected, via data, system, or address bus 1111, to display interface 1112 and broadband network interface 1114, to confer, at least in part, functionality to each of such components.

In access point 1105, memory 1145 can retain location and/or coverage area, e.g., macro sector, identifier(s); access list(s) that authorize access to wireless coverage through access point 1105; sector intelligence that can include ranking of coverage areas in the wireless environment of access point 1105, radio link quality and strength associated therewith, or the like. Memory 1145 also can store data structures, code instructions and program modules, system or device information, code sequences for scrambling, spreading and pilot transmission, access point configuration, and so on. Processor 1135 can be coupled, e.g., via a memory bus, to memory 1145 in order to store and retrieve information used to operate and/or confer functionality to the components, platform, and interface that reside within access point 1105.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions and/or processes described herein. Processors can exploit nano-scale architectures such as, but not limited to, molecular and quantum-dot based transistors, switches and gates, in order to optimize space usage or enhance performance of mobile devices. A processor may also be implemented as a combination of computing processing units.

In the subject specification, terms such as "store," "data store," "data storage," "database," and substantially any other information storage component relevant to operation and functionality of a component and/or process, refer to "memory components," or entities embodied in a "memory," or components comprising the memory. It will be appreciated that the memory components described herein can be either volatile memory or nonvolatile memory, or can include both volatile and nonvolatile memory.

By way of illustration, and not limitation, nonvolatile memory, for example, can be included in memory 1145, non-volatile memory (see below), disk storage (see below), and memory storage (see below). Further, nonvolatile memory can be included in read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Figure 12:
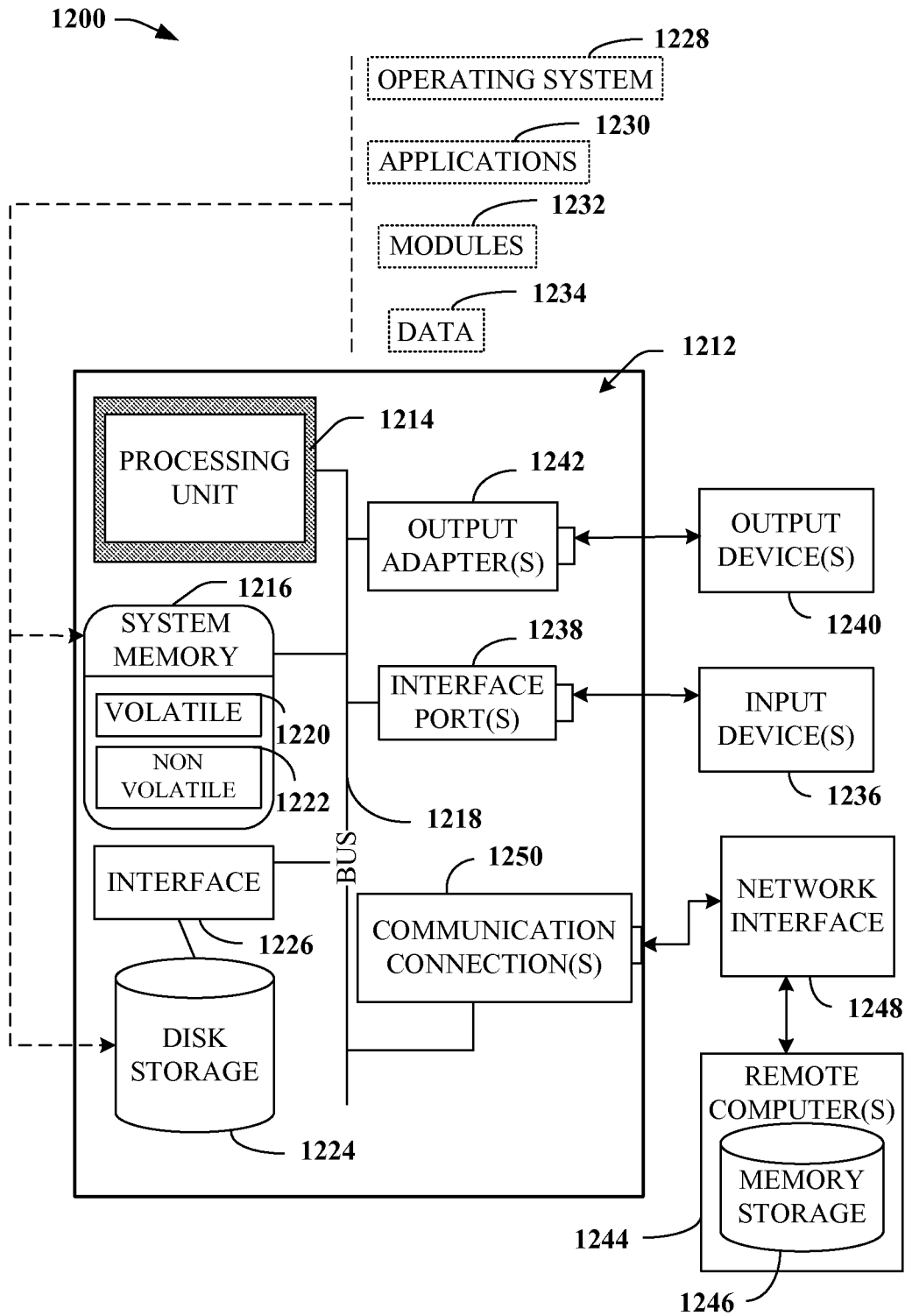
FIG. 12 illustrates a block diagram of a computing system, in accordance with an embodiment.

In order to provide a context for the various aspects of the disclosed subject matter, FIG. 12, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the various aspects also can be implemented in combination with other program modules. Generally, program modules include routines, programs, components, data structures, etc. that perform particular tasks and/or implement particular abstract data types.

Moreover, those skilled in the art will appreciate that the various aspects can be practiced with other computer system configurations, including single-processor or multiprocessor computer systems, mini-computing devices, mainframe computers, as well as personal computers, hand-held computing devices (e.g., PDA, phone, watch), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

With reference to FIG. 12, a block diagram of a computing system 1200 operable to execute the disclosed systems and methods is illustrated, in accordance with an embodiment. Computer 1212 includes a processing unit 1214, a system memory 1216, and a system bus 1218. System bus 1218 couples system components including, but not limited to, system memory 1216 to processing unit 1214. Processing unit 1214 can be any of various available processors. Dual microprocessors and other multiprocessor architectures also can be employed as processing unit 1214.

System bus 1218 can be any of several types of bus structure(s) including a memory bus or a memory controller, a peripheral bus or an external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCM-CIA), Firewire (IEEE 1194), and Small Computer Systems Interface (SCSI).

System memory 1216 includes volatile memory 1220 and nonvolatile memory 1222. A basic input/output system (BIOS), containing routines to transfer information between elements within computer 1212, such as during start-up, can be stored in nonvolatile memory 1222. By way of illustration, and not limitation, nonvolatile memory 1222 can include ROM, PROM, EPROM, EEPROM, or flash memory. Volatile memory 1220 includes RAM, which acts as external cache memory. By way of illustration and not limitation, RAM is available in many forms such as SRAM, dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1212 also includes removable/non-removable, volatile/non-volatile computer storage media. FIG. 12 illustrates, for example, disk storage 1224. Disk storage 1224 includes, but is not limited to, devices like a magnetic disk drive, floppy disk drive, tape drive, Jaz drive, Zip drive, LS-100 drive, flash memory card, or memory stick. In addition, disk storage 1224 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1224 to system bus 1218, a removable or non-removable interface is typically used, such as interface 1226.

It is to be appreciated that FIG. 12 describes software that acts as an intermediary between users and computer resources described in suitable operating environment 1200. Such software includes an operating system 1228. Operating system 1228, which can be stored on disk storage 1224, acts to control and allocate resources of computer system 1212. System applications 1230 take advantage of the management of resources by operating system 1228 through program modules 1232 and program data 1234 stored either in system memory 1216 or on disk storage 1224. It is to be appreciated that the disclosed subject matter can be implemented with various operating systems or combinations of operating systems.

A user can enter commands or information, e.g., via interface component 1226, into computer system 1212 through input device(s) 1236. Input devices 1236 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to processing unit 1214 through system bus 1218 via interface port(s) 1238. Interface port(s) 1238 include, for example, a serial port, a parallel port, a game port, and a universal serial bus (USB). Output device(s) 1240 use some of the same type of ports as input device(s) 1236.

Thus, for example, a USB port can be used to provide input to computer 1212 and to output information from computer 1212 to an output device 1240. Output adapter 1242 is provided to illustrate that there are some output devices 1240 like monitors, speakers, and printers, among other output devices 1240, which use special adapters. Output adapters 1242 include, by way of illustration and not limitation, video and sound cards that provide means of connection between output device 1240 and system bus 1218. It should be noted that other devices and/or systems of devices provide both input and output capabilities such as remote computer(s) 1244.

Computer 1212 can operate in a networked environment using logical connections to one or more remote computers, such as remote computer(s) 1244. Remote computer(s) 1244 can be a personal computer, a server, a router, a network PC, a workstation, a microprocessor based appliance, a peer device, or other common network node and the like, and typically includes many or all of the elements described relative to computer 1212.

For purposes of brevity, only a memory storage device 1246 is illustrated with remote computer(s) 1244. Remote computer(s) 1244 is logically connected to computer 1212 through a network interface 1248 and then physically connected via communication connection 1250. Network interface 1248 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1250 refer(s) to hardware/software employed to connect network interface 1248 to bus 1218. While communication connection 1250 is shown for illustrative clarity inside computer 1212, it can also be external to computer 1212. The hardware/software for connection to network interface 1248 can include, for example, internal and external technologies such as modems, including regular telephone grade modems, cable modems and DSL modems, ISDN adapters, and Ethernet cards.

It is to be noted that aspects, features, or advantages of the aspects described in the subject specification can be exploited in substantially any communication technology. For example, 4G technologies, Wi-Fi, WiMAX, Enhanced GPRS, 3GPP LTE, 3GPP2 UMB, 3GPP UMTS, HSPA, HSDPA, HSUPA, GERAN, UTRAN, LTE Advanced. Additionally, substantially all aspects disclosed herein can be exploited in legacy telecommunication technologies; e.g., GSM. In addition, mobile as well non-mobile networks (e.g., Internet, data service network such as IPTV) can exploit aspect or features described herein.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification and annexed drawings, terms such as "store," "data store," "data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory.

By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and dire Rambus RAM (DRRAM). Additionally, the disclosed memory components of systems or methods herein are intended to comprise, without being limited to comprising, these and any other suitable types of memory.

Various aspects or features described herein can be implemented as a method, apparatus, or article of manufacture using standard programming and/or engineering techniques. In addition, various aspects disclosed in the subject specification can also be implemented through program modules stored in a memory and executed by a processor, or other combination of hardware and software, or hardware and firmware.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

What has been described above includes examples of systems and methods that provide advantages of the one or more aspects. It is, of course, not possible to describe every conceivable combination of components or methods for purposes of describing the aspects, but one of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

As used in this application, the terms "component," "system," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration, both an application running on a server or network controller, and the server or network controller can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software, or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components. As further yet another example, interface(s) can include input/output (I/O) components as well as associated processor, application, or Application Programming Interface (API) components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

What is claimed is:

1. An apparatus, comprising:
a memory to store executable instructions; and
a processor, coupled to the memory, that facilitates execution of the executable instructions to perform operations, comprising:
monitoring a first state of a first user service activity and a second state of a second user service activity determined to be executing on a mobile device, wherein the first user service activity is a voice service and the second user service activity is a data service;

initiating storage of the first state of the first user service activity and the second state of the second user service activity to a network device of a network;

communicating, to other network devices of the network, location data representing a location of policy record information of the network device, wherein the first state of the first user service activity and the second state of the second user service activity are stored at the location; and communicating the first state of the first user service activity and the second state of the second user service activity to mobile services managed by the other network devices based on respective requests for information of the policy record information at the location, wherein the communicating the first state and the second state comprises reducing an amount of signaling between the apparatus and the other network devices.

2. The apparatus of claim 1, wherein the operations further comprise receiving information related to the second state of the second user service activity determined to be executing on the mobile device, and wherein the mobile device is located in a first geographic area.

3. The apparatus of claim 2, wherein the operations further comprise providing direct support for the mobile device in the first geographic area and indirect support for other mobile devices located in a second geographic area, and wherein a first portion of the first geographic area and a second portion of the second geographic area comprise a common area.

4. The apparatus of claim 1, wherein the operations further comprise preventing access to topology data representing a topology of home network devices of a home network by roaming network devices of a roaming network.

5. The apparatus of claim 1, wherein the first user service activity comprises a first activity and a second activity for the mobile device.

6. The apparatus of claim 1, wherein the first user service activity comprises a set of services provided to the mobile device.

7. The apparatus of claim 1, wherein the first user service activity is performed by different network devices of the network.

8. A method, comprising:

tracking, by a system comprising a processor, a first set of first user session data associated with a first session for a device and a second set of second user session data associated with a second session for the device, wherein the first session is a voice session and the second session is a data session;

temporarily caching, by the system, the first set of first user session data and the second set of second user session data;

sending, by the system, the first set of first user session data and the second set of second user session data to a data store associated with a network device of a network;

generating, by the system, data that references a location of the first set of first user session data and the second set of second user session data within the data store associated with the network device; and communicating, by the system, the first set of first user session data and the second set of second user session data to other network devices of the network based on a request, from the other network devices, that comprises the location, wherein the communicating comprises decreasing policy signaling related traffic among the other network devices.

9. The method of claim 8, further comprising:

receiving, by the system, an indication of a third session for the device;

obtaining, by the system, the first set of first user session data and the second set of second user session data from the data store; and applying, by the system, the first set of first user session data to the third session for the device, wherein the third session is determined to be executing on the device.

10. The method of claim 8, further comprising:

pushing, by the system, session record information of the first set of first user session data to a gateway device for authorized access.

11. The method of claim 10, wherein the pushing comprises providing the session record information to at least one of a network element, an application, a resource, or another gateway device.

12. The method of claim 8, further comprising associating, by the system, the first set of first user session data with policy record information.

13. The method of claim 8, further comprising communicating, by the system, with a roaming device of a roaming network, wherein the communicating blocks access to topology data representing a home network topology by the roaming device.

14. The method of claim 8, further comprising generating, by the system, a session record for the first set of first user session data, wherein the session record comprises an identification of the device and associated network elements.

15. The method of claim 8, further comprising facilitating by the system, routing between network devices and devices of at least five service zones.

16. A computer-readable storage device comprising executable instructions that, in response to execution, cause a system comprising a processor to perform operations, comprising:

monitoring a first set of first user service activities of a device determined to be occurring within a first geographic region, wherein the first set of first user service activities are related to a voice service;

monitoring a second set of second user service activities of the device determined to be occurring within the first geographic region, wherein the second set of second user services activities are related to a data service;

initiating storage of the first set of first user service activities and the second set of second user service activities to an identifiable location of a network data store; and applying a user service activity of the first set of first user service activities and the second set of second user service activities to a subsequent user session in response to determining the device is within a second geographic region and based on a request to access information stored at the identifiable location of the network data store, wherein the applying comprises mitigating an amount of signaling used to provide the subsequent user session.

17. The computer-readable storage device of claim 16, wherein the operations further comprise providing backup support for a network device of a network, wherein the network device monitors a third set of third user service activities associated with the second geographic region, and wherein a portion of the first geographic region and another portion of the second geographic region overlap.

18. The computer-readable storage device of claim 17, wherein the backup support provides geographic redundancy for the use of a policy as a network service.

19. The computer-readable storage device of claim 16, wherein the operations further comprise generating a reference to active policy record information stored by a network device of a network.

20. The computer-readable storage device of claim 16, wherein the operations further comprise communicating the first set of first user service activities and the second set of second user service activities to a network device of a network, and wherein the network device performs a function related to policy and charging functions.

* * * * *